United States Patent [19]

Morel

[11] 4,301,986
[45] Nov. 24, 1981

[54] NON-REMOVABLE FASTENING DEVICE

[75] Inventor: Henri Morel, Maule, France

[73] Assignee: ITW de France, Val d'Oise, France

[21] Appl. No.: 55,715

[22] Filed: Jul. 9, 1979

[30] Foreign Application Priority Data

Jul. 10, 1978 [FR] France .................. 78 20568

[51] Int. Cl.³ ............................................. F16M 13/00
[52] U.S. Cl. .................................................. 248/221.3
[58] Field of Search ................. 248/27.3, 221.3, 221.4, 248/235

[56] References Cited

U.S. PATENT DOCUMENTS

| 1,662,422 | 3/1928 | Hodges | 248/27.3 X |
| 2,113,535 | 4/1938 | Cund | 248/27.3 |
| 2,223,273 | 11/1940 | Slessman | 248/27.3 X |
| 3,469,493 | 9/1969 | Fisher | 248/239 X |
| 3,954,243 | 5/1976 | Sharp | 248/235 |
| 3,974,278 | 2/1974 | Frey et al. | 248/27.3 |
| 4,103,854 | 8/1978 | Pliml | 248/221.3 X |

Primary Examiner—William H. Schultz
Attorney, Agent, or Firm—J. R. Halvorsen; T. W. Buckman

[57] ABSTRACT

The invention relates to an unextractable fastening device for mounting in an opening formed in a panel.

The device is of the kind comprising a head, a curved retaining cam and a flexible locking element and is characterized in that it has a body complementary to and without clearance with the perimeter of the opening and in that a gap formed in said body enables said locking element to withdraw into said gap when the device is inserted into the opening.

The device is applicable to standard round, rectangular or square openings and withstands considerable loads without play.

6 Claims, 6 Drawing Figures

NON-REMOVABLE FASTENING DEVICE

This invention relates to an unextractable fastening device particularly suitable for heavy loads.

Although a great many fastening devices mountable on a panel or on any convenient support already exist, they require an opening of special design for heavy loads.

More particularly well-known is a device for mounting in an opening of special design or perimeter formed in a panel, which device comprises a head, a curved retaining cam and a flexible locking element, said curved cam being inserted into the opening by tilting the complete assembly when the device is being mounted.

Devices of the kind mentioned above have the major drawback that they cannot be used in standard round, rectangular or square openings because such openings are devoid of the ridge required by these known devices to enable them to withstand heavy loads.

It is the object of the present invention to provide very simple fastening elements capable of being handset into a panel or other convenient support formed with a standard round, rectangular or square opening therein. Such fastening elements can be manufactured in one piece at low cost and can withstand heavy loads which must manifestly be compatible with the strength of the panel or support; furthermore, they are unextractable and may in no case be induced by pressure to shift and thereby betray play. For this reason, they are particularly effective as safe fastening points for heavy loads.

The invention relates more particularly to an unextractable fastening device for mounting in an opening formed in a panel, of the kind comprising a head, a curved retaining cam and at least one flexible locking element, said device being characterized in that it has a body complementary without clearance with the perimeter of said opening and in that a gap formed in said body enables said locking element to withdraw thereinto when said device is inserted into said opening, whereby the device adapts to standard round, rectangular or square openings and withstands heavy loads without play, a constant bearing surface being formed between said body and the edge of said opening.

The description which follows with reference to the accompanying non-limitative exemplary drawings will give a clear understanding of how the invention can be carried into practice. In the drawings.

Figure 2:
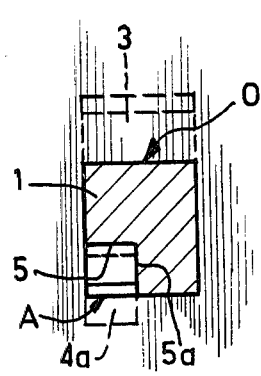
FIGS. 1 and 2 are respectively side elevation and sectional views of a form of embodiment of a fastening device according to this invention suitable for a square opening.

In the illustrated forms of embodiment of the invention, the device comprises a central body 1, a head 2 for bearing against the panel P having a standard opening O formed therein, a curved retaining cam 3 which after insertion or application of the fastening device comes to bear against the rear face of the panel, and a flexible locking element 4 the end 4a of which comes to bear, after insertion or setting of the locking device, against the edge A of the opening on the rear face.

A gap 5 is provided laterally in central body 1 whereby to receive, upon insertion of the device, the flexible locking element 4 which withdraws thereinto.

The central body is furthermore exactly complementary to the standard opening O, whereby constant contact exists between said body and the edge of the opening.

The subject fastening device of this invention is mounted on the panel in the following manner:

Retaining cam 3 is inserted through the opening O in the panel with a tilting movement which allows flexible locking element 4 to engage into gap 5 formed in body 1, which gap is complementary to said opening and penetrates up to where head 2 bears against the visible face of the panel.

Figure 3:
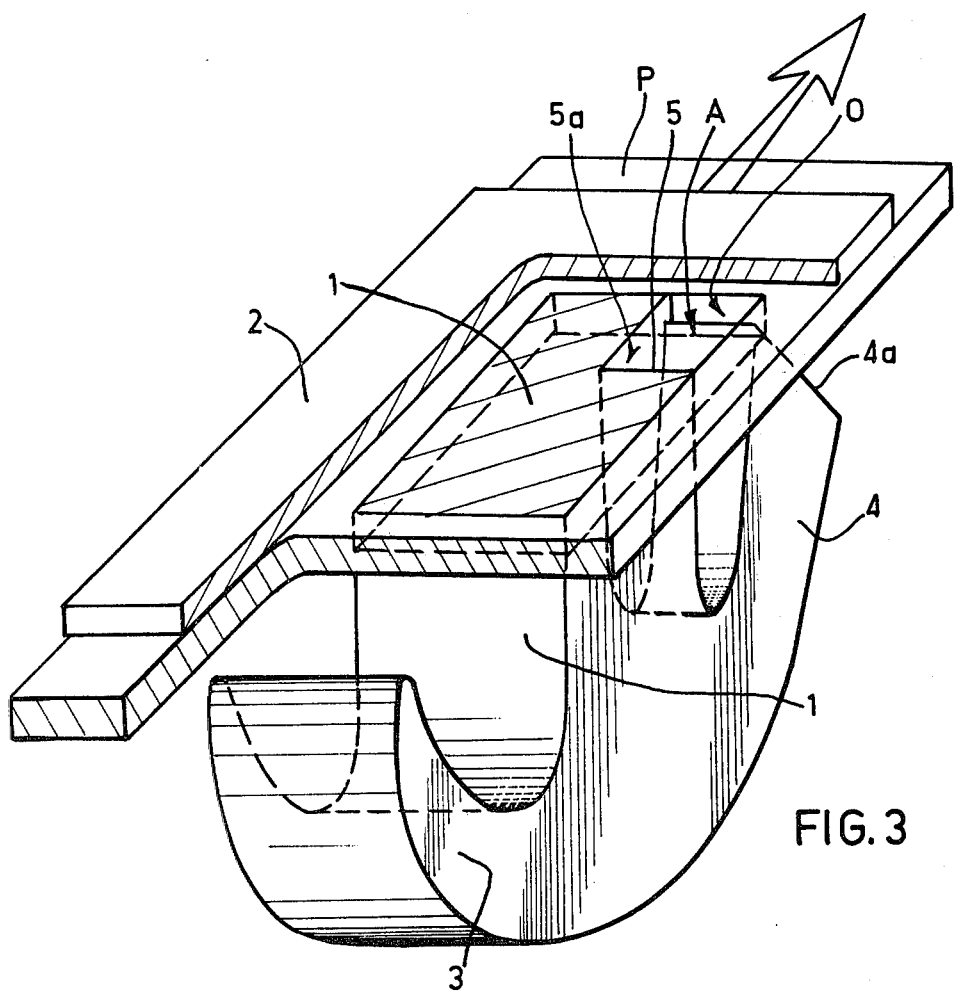
FIG. 3 shows in perspective with partial cutaway an embodiment suitable for a rectangular opening.

The tilting movement causes cam 3 to bear against the hidden face of the panel, thereby enabling the fastening device to effectively withstand the resultant load for which it was designed (represented by the arrow in FIG. 3 of the drawings).

During this movement, the flexible locking element 4 passes behind the hidden face of the panel, whereupon the fastening device becomes unextractable by virtue of retaining cam 3 assisted by locking element 4 and cannot be moved by reason of the design of body 1 exactly matching the perimeter of the opening.

Figure 1:
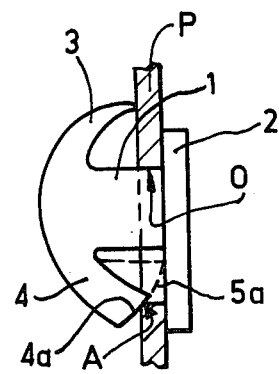

In the form of embodiment shown in FIGS. 1 and 2 and in FIG. 3, the fastening device is intended for mounting in a rectangular or square opening.

Figure 5:
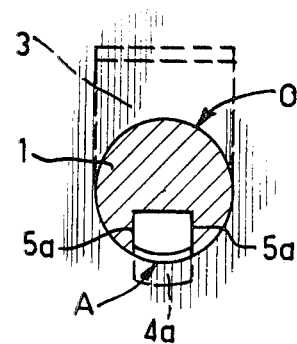
FIGS. 4 and 5 are respectively side elevation and sectional views of a form of embodiment of a fastening device according to the invention suitable for a round opening.
Figure 4:
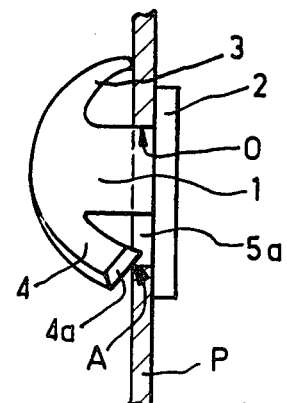
Figure 6:
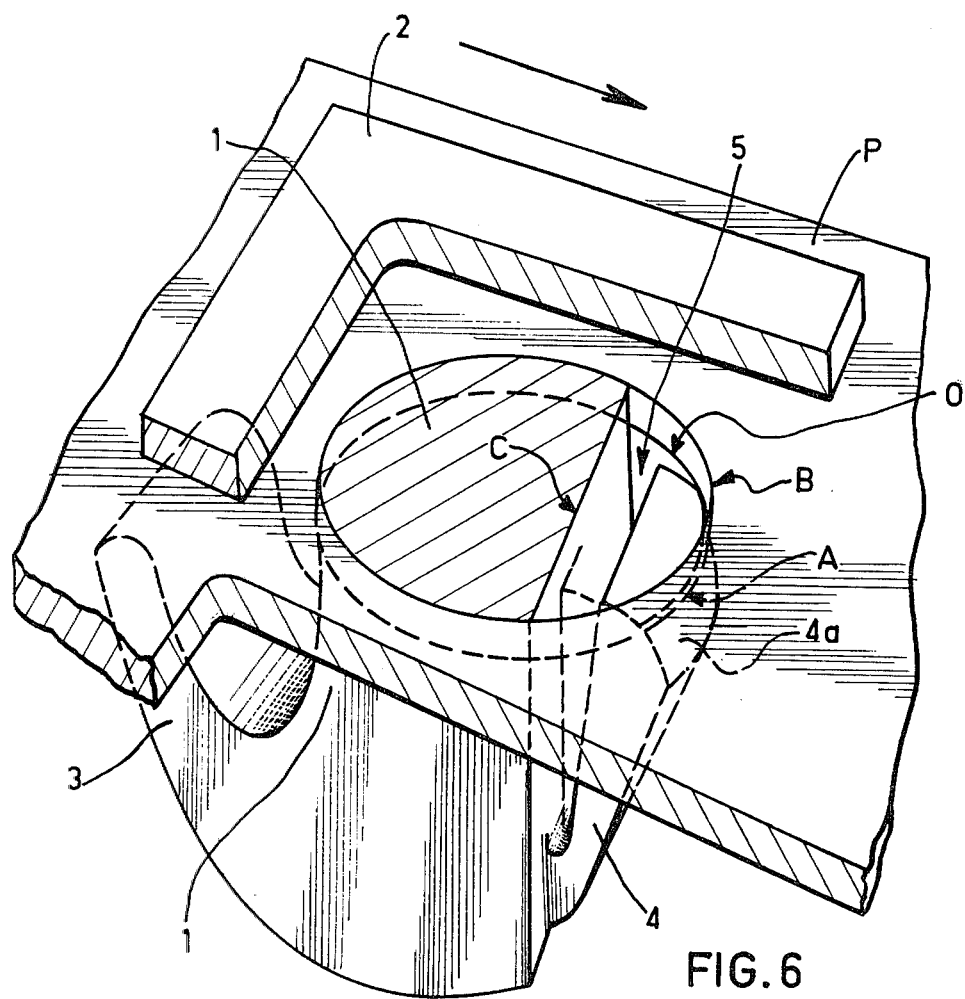
FIG. 6 shows in perspective with partial cutaway still another embodiment suitable for a round opening.

In the forms of embodiment shown in FIGS. 4 and 5 and in FIG. 6, the fastening device is intended for mounting in a round opening.

In all cases, the complementarity is such that no clearance exists between central body 1 and opening O. This complementarity is furthermore absolute at the time of insertion when said body and flexible element 4 engaged in gap 5 complete each other.

In the embodiments in FIGS. 1 and 2, FIG. 3, and FIGS. 4 and 5, the contour of gap 5 matches a cross-section of flexible locking element 4.

In the form of embodiment in FIG. 6, gap 5 is bounded by an arc B of the opening and its chord C, the position of this chord with respect to the arc and to a diameter of the opening being such that play of central body 1 in opening O is prevented.

In the forms of embodiment in FIGS. 1 and 2 and FIGS. 4 and 5, the flank 5a of gap 5 is substantially equal to the complimentary edge of locking element 4 when it is flexed into gap 5. The arc defined by the end 4a when element 4 is flexed as seen by the dotted line in FIG. 1, has a variation in spacing relative to the underside of head 2 substantially equal to the thickness of the panel P and hence of the edge of the opening.

In the form of embodiment in FIG. 3, the flank 5a of gap 5 extends into a zone comprising the connection of flexible locking element 4 with central body 1.

Thrust head 2 can be adaptable to any convenient hook or any shape suitable for withstanding the heavy load for which the device is designed. This accessory part, which may be of any convenient shape, is not shown in the drawings and does not form part of the present invention.

It is to be noted that the subject device of this invention can be manufactured inexpensively, in one piece, out of plastics for example, and that a plurality of flexible locking elements 4 and consequently of gaps 5 can be provided.

It goes without saying that changes and substitutions may be made in the preferred exemplary embodiments hereinbefore described without departing from the scope of the invention.

I claim:

1. A one-piece non-removable fastening device in combination with a predetermined uniform and uninterrupted opening formed in a panel, said fastening device including a head, a body extending from said head and having a solid cross-sectional configuration at its juncture with said head that is substantially identical to said opening, a curved retaining cam extending outwardly laterally from the free end of said body and thence reversely extending upwardly toward said head, the free end of said cam terminating in spaced opposition to a plane lying on the juncture of said head and body, and at least one flexible locking element, a gap formed in said body which enables said locking element to be withdrawn into said gap at the moment of inserting the device into said complementary opening, whereby the device is adapted to withstand, without play, considerable shear loads since a substantially continuous solid span is formed between the body and the edge of said opening except for said gap in said body.

2. Device according to claim 1, in which the contour of said gap substantially corresponds to a cross-section of said flexible locking element and at the moment of inserting said device in said opening, said body and said flexible locking element flexed into said gap become mutually complete effecting substantially total complementarity with said opening.

3. Device according to claim 1, in which said opening is round and said gap is bounded by an arc of said opening less than 180° in extent and the chord of this arc, the position of said chord with respect to the arc and to the diameter of said opening being such that play of said body in said opening is prevented.

4. Device according to claim 1, in which the arc defined by the free end of said flexible locking element as it is flexed into said gap has a variation in spacing relative to the underside of said head substantially equal to the thickness of said panel and hence to the edge of said opening.

5. Device according to claim 1, in which said gap extends from said opening just into a zone comprising the connection of said flexible locking element with said body.

6. Device according to claim 1 in which said opening and said body are substantially rectangular and complimentary in configuration.

* * * * *